United States Patent Office.

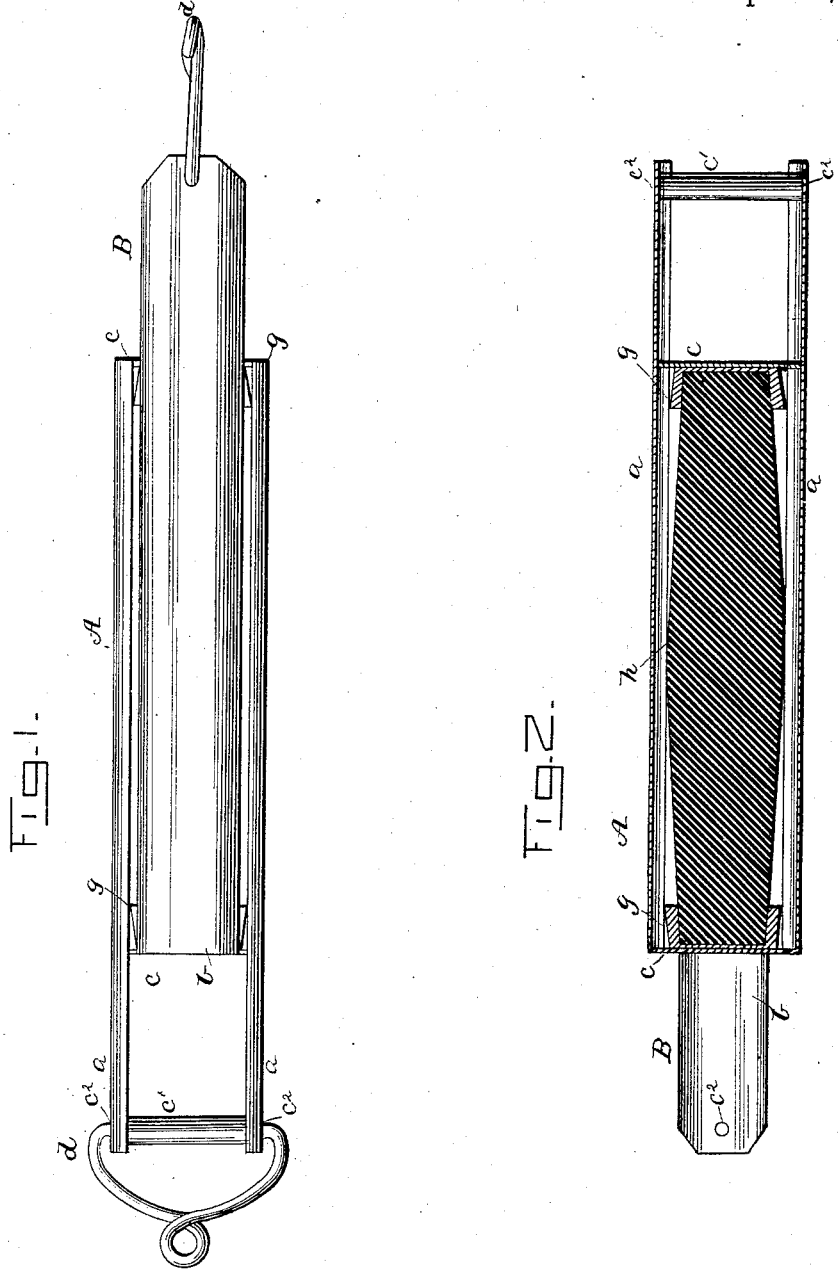

WILLIAM R. BELDING, OF EUREKA SPRINGS, ARKANSAS.

SPRING-LINK.

SPECIFICATION forming part of Letters Patent No. 315,223, dated April 7, 1885.

Application filed August 13, 1884. (No model.)

*To all whom it may concern:*

Be it known that I, WILLIAM R. BELDING, a citizen of the United States, residing at Eureka Springs, in the county of Carroll and State of Arkansas, have invented certain new and useful Improvements in Traction Compression-Springs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to traction compression-springs; and it consists in the novel construction and arrangement of its parts.

In the accompanying drawings, Figure 1 is a longitudinal view of the same. Fig. 2 is a longitudinal sectional view of the same.

My invention is described as follows: I make two compression-links, A and B, each consisting of two concave parts, $a\ a\ b\ b$, so formed that when the four parts are put together they form one hollow cylinder. These two concave pieces $a\ a$ and $b\ b$ are joined together at one end by a circular head, $c$, the other ends being held open by a hollow rod, $c'$, and loop $d$. Through this hollow rod and holes $c^2$ is secured the loop $d$, which serves the purposes of attaching the traction compression-link to any harness or vehicle, and of keeping this end of the said two parts $a\ a$ and $b\ b$ closed down on the ends of hollow rod $c'$. In the closed end of each of these links A and B, I place a cup, $g$, which fits into the same. I have a compression rubber block, $h$, which is nearly as long as the two links A and B, and at its middle fits into the hollow cylinder formed by these two links; but, commencing at the middle, it tapers down and becomes smaller at each end until each end fits into cups $g$. The tapering of this compression rubber block is to allow the same to be longitudinally compressed, for, if it were the same size its entire length, when pressure was brought to bear against its ends its lateral expansion would prevent its longitudinal compression to a great extent and greatly impair its value. The cups $c$ are just as thick as the ends of the compression-block $h$ is less at its ends than at its middle, and are for the purpose of holding the ends of the same in the center of the cylinder to prevent them from pressing against the sides of the same.

Having described my invention, what I claim as new, and desire to secure by Letters Patent, is—

In a traction compression-link, the combination of parts $a\ a$ and $b\ b$, joined together at one end by a circular head, $c$, with hollow rod $c'$, held in place by loop $d$, cups $g$, fitting into the closed ends of links A and B, and rubber compression-block $h$, fitting into the cylinder at its middle, and tapering smaller at each end until it fits into cups $c$, substantially as shown and described, and for the purposes set forth.

In testimony whereof I affix my signature in presence of two witnesses.

WILLIAM R. BELDING.

Witnesses:
JOHN S. DUFFIE,
CLARENCE H. BUCKLER.